Patented June 21, 1949

2,473,930

UNITED STATES PATENT OFFICE 2,473,930

PROCESS FOR BLEACHING GLYCERIDIC ESTERS

Eric R. Woodward, New York, N. Y., assignor to Mathieson Chemical Corporation, a corporation of Virginia No Drawing. Application August 30, 1947, Serial No. 771,561

7 Claims. (Cl. 260—423)

1

The present invention relates to the bleaching of fatty acid esters, for example, animal and vegetable fats and oils consisting essentially of glycerides, and provides an improved process whereby such fatty acid esters may be economically bleached or their color materially improved. The invention is especially useful in the bleaching of tallow.

Tallow, for instance, is composed primarily of the glycerides of stearic, palmitic and oleic acids, but generally contains substantial proportions of the corresponding free fatty acids. Other fatty acid esters likewise frequently contain substantial proportions of free fatty acids.

Tallow and other animal and vegetable fats and oils in the crude or partially refined state also usually contain color bodies which impart to them an objectionable brown, yellow, green, gray or off-white color, depending upon their state of refinement.

Various methods have been proposed for improving the color of these fatty materials, including a process in which chlorine dioxide is generated by reacting a chlorate or a chlorite with sulfuric acid in an aqueous layer beneath but in contact with the fatty material and permitting the generated chlorine dioxide to diffuse upwardly into the fatty material. This method of bleaching fatty materials has not generally been found to be satisfactory for the reason that there is an initial tendency towards a deepening of the color of the fatty materials so treated, which color must be removed by prolonged treatment, and also because of the uneconomical use of the chemicals involved. A further disadvantage of such proposed process is the nceessity of using equipment capable of resisting corrosion in the acid environment.

It has also been proposed to bleach fatty materials containing free fatty acids by admixing therewith an aqueous solution of a chlorite or a chlorate and a chemical agent reacting therewith to generate chlorine dioxide. This process has been subject to the objections that there is a similar initial tendency towards darkening a relatively high consumption of the chlorite and also that there is a tendency for the fatty material to become emulsified with the water of the aqueous solution. Each of these previously proposed processes is subject to the further objections that by the bleaching treatment the fatty material is contaminated by metal salt reaction products and water, requiring additional operations for their removal.

I have previously discovered that tallow may, with advantage, be bleached by blowing the tallow with a mixture of air and a relatively small proportion of chlorine dioxide from an extraneous source. Difficulties were, however, encountered in the proposed method, apparently due to the fatty acid content of the tallow. Fatty materials containing substantial amounts of free fatty acids appeared to be much less susceptible to permanent color improvement. The present invention constitutes an improvement in such method of bleaching tallow or other fats and provides an improved process whereby fats containing appreciable amounts of fatty acid may be more readily and permanently and more economically bleached.

I have now found that difficulties previously encountered, due to the presence of substantial amounts of free fatty acid in the fat, may be avoided and that marked economy in processing time and in reagent costs may be effected by treating the tallow, or other fats, containing substantial amounts of free fatty acid, with dry chlorine dioxide gas provided the fat is substantially dry and substantially free from mineral acidity. By the expression "substantially dry," appearing herein and in the appended claims, referring to the fat being bleached, I mean that the amount of moisture in the bleaching kettle, either as a separate water layer or admixed with the fat, does not exceed about 1%, by weight, of the fat. By the expression "mineral acidity," I mean acidity due to the presence of a mineral acid or salts as distinguished from fatty acid acidity.

Under such conditions of operation, I have found that an amount of free fatty acid up to as high as 10% may be present in the fat, tallow for instance, without materially influencing the rate or extent of bleaching or permanency of color improvement and that further marked economy in the amount of chlorine dioxide required to effect the desired bleaching is attained.

Predicated upon my discovery, my present process comprises blowing dry chlorine dioxide gas through a substantially dry body of the fat, free from mineral acidity, and containing not in excess of about 10% by weight of free fatty acid.

In carrying out the process the fat, tallow for instance, is heated to an elevated temperature, at which the fat is liquid, say 180–200° F., in a kettle as by means of steam coils, or a steam jacket, and dry chlorine dioxide gas from an extraneous source and in admixture with an inert gas, air for instance, is introduced into the lower end of the kettle so as to bubble upwardly through the molten fat. The gas mixture is in this way uniformly dispersed through the fat.

Chlorine dioxide is hazardous to handle at high concentrations. However, in admixture with air, or other inert gas, in concentrations such that the partial pressure of the chlorine dioxide does not exceed about 30 mm. of mercury it may be handled safely.

The chlorine dioxide gas is generated without the kettle or other treating chamber, by known means, for instance, by reacting chlorine gas with a chlorite. This reaction may safely be carried out by passing a mixture of chlorine gas and air through a bed of granular chlorite. The concentration of the chlorine dioxide in the effluent gas from the generator is controlled by the concentration of the chlorine gas mixture passed to the generator. In place of air, other inert gas, for instance, nitrogen, or carbon dioxide, may be employed.

The concentration of the chlorine dioxide in the gas mixture used in my present process may be varied somewhat. Concentrations such that the partial pressure of the chlorine dioxide is from 5 to about 30 mm. of mercury may be used with advantage. However, mixtures in which the partial pressure of the chlorine dioxide is about 20 mm. of mercury has been found particularly advantageous.

The period of the chlorine dioxide treatment has likewise been found to vary considerably, depending upon the extent of bleaching required, the rate at which the gas mixture is passed through the fat and also upon the concentration of the chlorine dioxide in the gas mixture. Where the partial pressure of chlorine dioxide in the mixture is about 20 mm. of mercury, satisfactory results are usually obtained by a treatment of about one-half to one hour. In general the treatment is continued until the desired color is obtained, and where a very dark fatty material is being bleached, the treatment may extend over a period of two hours or even longer.

Under conditions usually encountered in the bleaching of tallow, a chlorine dioxide dosage of about 145 pounds per million pounds of tallow is sufficient to effect the desired color improvement. Even smaller dosages may frequently be used. Under more adverse conditions dosages up to about 215 pounds of $ClO_2$ per million pounds of fat may be used with advantage.

A further advantage of the present invention is that the dosage of chlorine dioxide which may be used without detrimentally affecting the fatty material is not particularly critical. It is desirable for economic reasons to use no more chlorine dioxide than is required to effect the desired color improvement. I have found, however, that where the amount of chlorine dioxide used is considerably in excess of that required to effect the bleaching, there is a tendency to oxidize the tallow, and in some instances a tendency towards color reversion has been observed. Any such tendency is generally avoided where the amount of chlorine dioxide used does not exceed about 1,000 pounds per million pounds of the material being treated.

My process will be further described and illustrated by the following specific examples of its application to the bleaching of tallow. In each instance, a dry mixture of chlorine dioxide and air was blown upwardly through a large body of the tallow in a kettle at a temperature of about 180 to 200° F., the partial pressure of the chlorine dioxide in the gas mixture being about 20 mm. of mercury. The chlorine dioxide was generated by blowing a mixture of chlorine and air through a separate chlorine dioxide generator, the concentration of chlorine in the mixture being so proportioned as to give the above indicated concentration of chlorine dioxide in the effluent gases from the generator. The proportion of chlorine dioxide used was, in each instance, about 145 pounds of chlorine dioxide per million pounds of tallow and this, together with the air, was blown through the tallow over a period of about one hour. In each instance, the color of the tallow was thereby reduced to 5 FAC and no color reversion was observed. The moisture content, free fatty acid content, titer and color of the tallow prior to the bleaching operation are set forth in the following tabulation.

| Example | Moisture Content | FFA Content | Titer | Color FAC |
|---|---|---|---|---|
| | Per Cent | Per Cent | | |
| 1 | 0.36 | 1.80 | 42.0 | 9 |
| 2 | 0.57 | 3.00 | 42.1 | 11 |
| 3 | 0.48 | 1.98 | 42.2 | 11A |
| 4 | 0.34 | 2.44 | 41.8 | 11 |
| 5 | 0.36 | 2.30 | 42.2 | 11 |

While my improved process is particularly useful, as applied to tallow, it is generally applicable to the bleaching of esters of animal and vegetable fatty acids, and is especially useful in the bleaching of esters of fatty acids containing ten or more carbon atoms per molecule, including the mono-, di- and tri-glycerides. It has been used with advantage in the bleaching of long chain fatty acid esters and partial esters.

By reason of the fact that the fat is bleached, in accordance with my present process, in the substantial absence of water, there is no tendency for the fatty materials to become emulsified. Further, since no water is introduced with the bleaching agent, no subsequent treating step for the removal of water from that source is necessary. The only moisture present in the fat during the bleaching step of my process is the small amount of residual moisture remaining dispersed in the fat from the previous washing and settling operation. Since the washing and settling operations are normally carried on at an elevated temperature, the residual moisture is quite low, usually only a fraction of one per cent.

In the treatment of fats, such as tallow, normally solid or semi-solid at room temperature, the bleaching operations will be carried out at an elevated temperature, above the melting point of the fats. In the treatment of fatty materials melting below room temperature, an elevated temperature is not essential to the carrying out of my process.

The invention is of particular utility, as previously noted, in the bleaching or improving the color of tallow containing substantial, though minor, proportions of free fatty acids, that is, proportions of free fatty acid ranging from ½% to 10% by weight, and avoids the necessity of freeing the fat of residual free fatty acid prior to the bleaching as has heretofore been considered necessary in order adequately to bleach the tallow with chlorine dioxide. The presence of larger proportions of free fatty acid in the fat has been found deleteriously to affect the permanent color improvement attained by my process and where such larger amounts of free fatty acids are present, the proportions should be reduced, by known methods, to not in excess of 10% prior to treatment by my process.

Also, where proportions of moisture dispersed in the fat to be bleached exceed about 1% by weight, such excess moisture should be removed, as by settling or air blowing, prior to my treatment of the fat with the chlorine dioxide, as herein described. Residual moisture present in the fat will usually be further substantially reduced by the blowing of the fat with the chlorine dioxide-air mixture in accordance with my process.

In the bleaching of tallow, I have found it particularly advantageous to reduce the moisture content of the tallow to about ½%, or less, prior to treatment in accordance with my present process, as, under such conditions, maximum economy of reagents and permanent color improvement are generally attained.

I claim:

1. A process for improving the color of glyceridic esters of long chain fatty acids containing minor proportions of free fatty acids which comprises intimately dispersing a dry mixture of chlorine dioxide and an inert gas through the fatty material while the latter is at a temperature at which it is fluid, is substantially dry and free from mineral acidity, the fatty acid content of the fatty material not exceeding 10% by weight.

2. The process of claim 1 in which the inert gas is air.

3. The process of claim 1 in which the inert gas is air and the concentration of chlorine dioxide in the mixture is such as to exert a partial pressure of 5 to 30 millimeters of mercury.

4. A process for bleaching tallow containing minor proportions of free fatty acids which comprises blowing a body of the tallow with a dry mixture of chlorine dioxide and air while the tallow is at a temperature at which it is fluid, is substantially dry and free from mineral acidity, the fatty acid content of the tallow not exceeding 10% by weight and the concentration of the chlorine dioxide in the chlorine dioxide-air mixture being such as to exert a partial pressure of 5 to 30 mm. of mercury.

5. A process for bleaching tallow which comprises blowing a dry mixture of chlorine dioxide and air upwardly through a substantially dry body of the tallow while the latter is at a temperature of 180 to 200° F. and is free from mineral acid, the concentration of the chlorine dioxide in the chlorine dioxide-air mixture being about 20 mm. of mercury, and continuing the blowing until the desired extent of bleaching has been attained.

6. A process for bleaching tallow which comprises blowing a dry mixture of chlorine dioxide and air upwardly through a substantially dry body of the tallow while the latter is at a temperature of 180 to 200° F. and is free from mineral acid, the concentration of the chlorine dioxide in the chlorine dioxide-air mixture being about 20 mm. of mercury, and continuing the blowing until about 145 pounds of chlorine dioxide per million pounds of tallow has been blown through the body of tallow.

7. A process for bleaching tallow which comprises blowing a dry mixture of chlorine dioxide and air upwardly through a substantially dry body of the tallow while the latter is at a temperature of 180 to 200° F., contains not in excess of about ½% moisture and is free from mineral acid, the concentration of the chlorine dioxide in the chlorine dioxide-air mixture being about 20 mm. of mercury, and continuing the blowing until the desired extent of bleaching has been attained.

ERIC R. WOODWARD.

REFERENCES CITED

The following references are of record in the file of this patent:

UNITED STATES PATENTS

| Number | Name | Date |
|---|---|---|
| 2,269,667 | Kauffman | Jan. 13, 1942 |